UNITED STATES PATENT OFFICE.

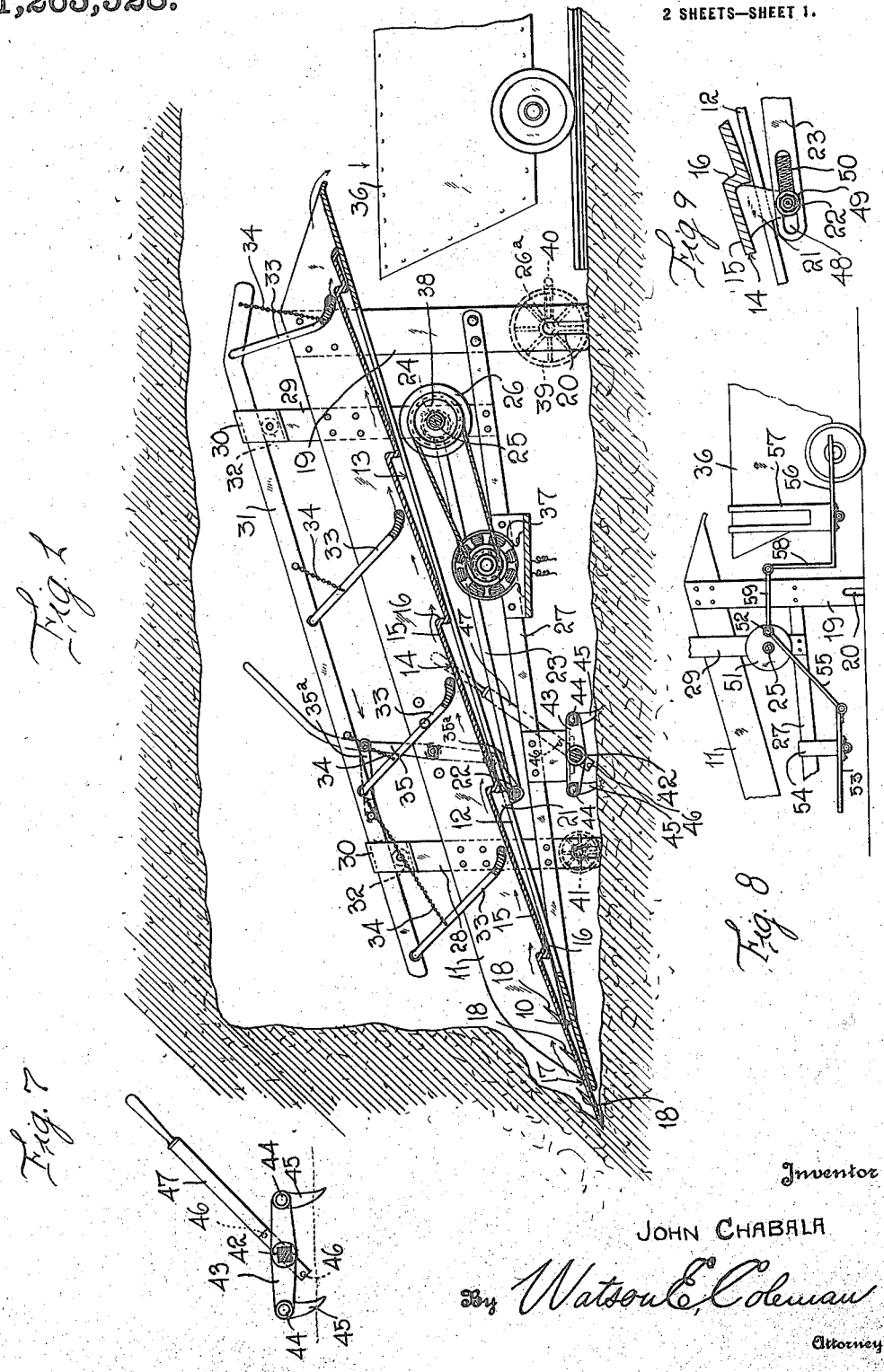

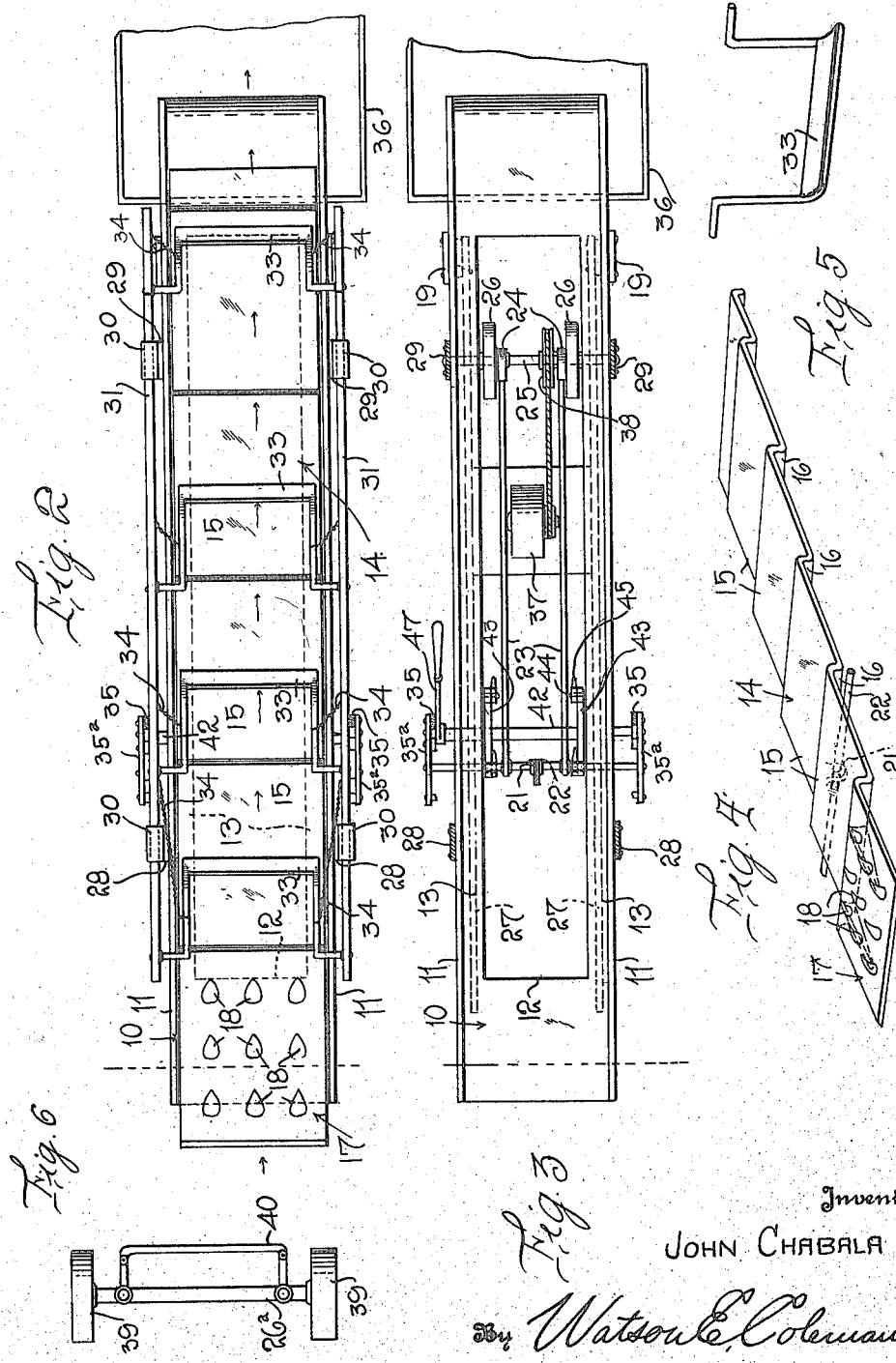

JOHN CHABALA, OF CUDDY, PENNSYLVANIA.

COAL ELEVATOR AND LOADER.

1,263,528.

Specification of Letters Patent.   Patented Apr. 23, 1918.

Application filed November 14, 1917. Serial No. 201,962.

*To all whom it may concern:*

Be it known that I, JOHN CHABALA, a citizen of the United States, residing at Cuddy, in the county of Allegheny and State of Pennsylvania, have invented certain new and useful Improvements in Coal Elevators and Loaders, of which the following is a specification, reference being had to the accompanying drawings.
This invention relates to elevating and loading devices, and particularly to means for loading coal or other like material as it is being mined from the floor of the tunnel into a pit wagon.
The general object of the invention is, as above indicated; and A further object is to provide a mechanism of this character embodying an upwardly inclined chute, one end of which is adapted to be inserted beneath the breast of the coal, the other end being supported above a pit wagon and a reciprocating elevating plate formed with steps disposed within the chute and reciprocable to cause the coal to move upward, step by step, and eventually be discharged into the pit wagon.

A further object is to provide a plurality of depending scrapers mounted for reciprocation above the elevator and dipping into the chute, these scrapers swinging freely in one direction, but being held from swinging movement in the opposite direction to thereby assist in elevating the coal upward along the elevator itself.
A further object is to provide means whereby the reciprocating parts may be manually operated or operated by power if desired.

A further object is to provide means whereby the mechanism may be fed longitudinally along the floor of the tunnel toward the breast thereof or shifted away from the breast.

Other objects will appear in the course of the following description.

My invention is illustrated in the accompanying drawings, wherein:—

Figure 1 is a longitudinal sectional view of an elevating and loading machine constructed in accordance with my invention;

Fig. 2 is a top plan view of the construction shown in Fig. 1:

Fig. 3 is a top plan view of the chute with the elevating plate and allied parts removed, the legs 28 and 29 being in section;

Fig. 4 is a perspective view of the elevating plate;

Fig. 5 is a perspective view of one of the members 33;

Fig. 6 is a top plan view of the truck for supporting the machine;

Fig. 7 is a side elevation of the means for feeding the machine, the extremities of the shaft 42 being in section;

Fig. 8 is a fragmentary side elevation showing another manner of driving the shaft 25;

Fig. 9 is a fragmentary longitudinal section of the plate 14 showing in elevation the connection of this plate to the rod 23.

Referring to these drawings, 10 designates the floor of a chute having side walls 11, which extend upward in an approximately vertical relation from the floor of the chute. The floor of the chute is cut out as at 12, the longitudinally extending opening so formed terminating short of the ends of the chute and being narrower than the bottom of the chute so as to leave a ledge 13 along the sides of the opening. Disposed on this ledge, that is, upon the bottom of the chute for reciprocation thereon, is a cutting and elevating machine consisting of a plate 14 corrugated to provide a series of upwardly and rearwardly inclined faces 15, with risers 16. The faces 15 are relatively long, that is, approximately about two feet long, and the risers 16 about four inches high. The forward end 17 of this plate 14 is relatively long and is provided on its upper face with upwardly and rearwardly extending teeth 18, which may be riveted to the plate or attached thereto in any other suitable manner.

For the purpose of supporting the chute at an angle to the horizontal, I provide the oppositely disposed legs 19, which may be riveted to the chute in any suitable manner and braced from each other, as will be later described, these legs being slotted at their lower ends as at 20 for the reception of the axle 26$^a$ of a supporting truck, as will be later described. Normally these legs rest upon the bottom of the tunnel.

For the purpose of reciprocating the elevating and cutting plate 14, I provide the forward end of this plate with downwardly extending lugs 21 having a transversely extending pin 22. To this pin are attached a pair of eccentric rods or pitmen 23 which extend to and are operatively engaged with eccentrics 24 mounted upon a transverse shaft 25 and carrying fly wheels 26. This shaft is supported in the rear vertical supporting standards 29. Braces 27 extend from the lower end of the rear standard 29 to the forward end of the chute 10.

Riveted to the side walls 11 of the chute and extending above these side walls to any desired height are the supporting standards 28 and 29. The braces 27 are connected to the lower ends of the standards 28 and 29. The upper ends of the standards 28 and 29 are bent over so as to form guides 30 and disposed in these guides are longitudinally extending reciprocable bars 31, which are supported on rollers 32 mounted in the guides. Pivotally mounted upon these bars 31 are the downwardly and rearwardly depending scraping members 33. These are U-shaped in form to conform to the shape of the chute and extend downward and rearward into the chute. Chains 34 prevent these scrapers 33 from swinging forward beyond a downwardly and rearwardly extending position, but upon a forward movement of the bars 31, these scrapers may ride over coal in the chute. Upon a rearward movement of the bars 31, however, the scrapers will engage the coal and shift it upward along the chute.

For the purpose of operating the scrapers, I provide levers 35 pivotally mounted upon the side 11 and operatively connected at their lower ends to the cross bar 22 and at their upper ends to the bars 31 by links 35ª. It will thus be seen that as the elevating and cutting member 14 moves forward, the members 31 will move rearward carrying with them the scrapers 33 and that as the member 14 moves upward and rearward, the bars 31 will move downward and forward carrying with them the scrapers 33. Thus as these parts are reciprocated, coal which may drop upon the forward end of the plate 14 will be carried rearward and gradually the mass of coal within the chute will be carried up and dumped into the pit wagon 36.

The driving shaft 25 may be operated in any suitable manner either by power or manually, but I have illustrated in Fig. 1, an electric motor 37 mounted upon the frame of the machine and connected by a rope drive to a band wheel 38 mounted upon the shaft 25. Any other suitable motor may be used, however, or the shaft 25 may be rotated by manually operable means such as will be hereafter disclosed.

For the purpose of supporting the rear end of the elevator frame, I provide a truck, as illustrated in Fig. 6, comprising an axle 26ª which is adapted to be inserted within the slots 20, this axle being provided with a pair of wheels 39 mounted on knuckles pivoted for movement in a horizontal plane, the knuckles being connected by a transversely extending rod 40, whereby both wheels may be caused to move together and whereby both wheels may be slewed around so as to guide the truck in any direction required. When the machine is in actual operation, this truck is removed and the legs 19 rest upon the floor of the tunnel. A detachable truck 41 is also provided for the forward end of the machine.

For the purpose of shifting the machine forward, as when the coal is cut, or shifting it rearward in case it be desired to withdraw the machine from the breast of the coal, I provide a transverse shaft 42, which is square at its ends and which is operatively supported for oscillation upon the chute in any suitable manner. Attached to the ends of the shaft are the longitudinally extending bars 43, having outwardly projecting pins 44 upon which are pivoted the prongs 45. These prongs are adapted to engage in the floor of the tunnel and when the shaft 42 is oscillated in one direction, one of the prongs will be lowered and pushed rearward and the other prong raised, and thus this prong will swing forward. Then upon a reverse operation, the last named prong will engage the floor of the tunnel and the first prong will rise and swing forward. Thus by oscillating the shaft 42, the machine may be caused to advance. It will be noticed that the shaft 42 is provided with sockets 46 which are oppositely directed and that a handle 47 is provided which is engageable in either one of the sockets. When the parts are in the position shown in Fig. 1, an oscillation of the handle will cause the machine to move forward, but by rotating the shaft entirely over, first removing the handle 47, and then engaging the handle with the other socket, the prongs will be disposed in a forwardly and downwardly extending position and the machine may be caused to move rearward or away from the breast.

The teeth 18 which are attached to the forward end of the elevating plate 14 are so formed that they will engage relatively fine coal and preferably provision is made for permitting the extremity of the plate 15 to strike the coal without preventing the full rotation of the shaft 25, as under some circumstances the plate 14 will be disposed so close to the coal that it may strike it. Normally, however, this will not be the case. For the purpose of permitting this plate 14 to strike the coal and yet permit the free rotation of the shaft 25, I preferably slot the rods 23 as at 48 (see Fig. 9) and dispose in this slot the sliding shaft engaging member 49, which is urged in one direction by means of the spring 50. Any other means to this end may be used, however. It is obvious now that if the pin 22 is impeded in its forward movement the connecting rod may move forward with practically no impediment.

As before stated, I may drive the shaft 25 in any suitable manner, but in Fig. 8 I show manually operable means for driving the shaft. To this end, the shaft carries upon it a disk 51 having a crank pin 52 projecting from it and mounted upon the braces 27 is a platform 53. This platform is illustrated as being pivoted to a hanger 54, the upper end of which is hook shaped to engage over the braces 27. One end of this platform is connected by a connecting rod 55 to the crank pin 52 and the operator stands upon this platform with his feet disposed one on each side of the hanger 54 and by oscillating the platform rotates the shaft 25. A second platform 56 is illustrated as mounted upon a hanger 57 engaging over the pit wagon 36 and this platform 56 is provided with a vertical extension 58 which is braced rigidly from the platform, the upper end of this extension being connected by a rod 59 or pitman to the crank pin 52. The operator standing upon the platform 56 may handle coal being discharged into the pit wagon and spread the contents properly in the pit wagon and the other platform 52 may be disposed so far forward as to permit the operator attending to the cutting down of the coal from the breast. I do not wish to limit myself, however, to the use of these devices, nor do I wish to limit myself to the particular manner of driving the shaft 25 illustrated in Fig. 1 as other forms of drive may be used.

The general operation of this machine will be obvious from what has gone before. The rotation of the shaft 25 will cause a reciprocating motion to be given to the connecting rod 23 and this will cause a jigging movement to be transmitted to the elevating plate 14. Thus the coal which may fall down upon the lower end of the plate from the breast will be jigged upward upon each reciprocation of the elevating plate, the risers 16 acting to hold the coal as it is so moved and the scrapers 33 also acting to hold the coal in its upward movement. Thus the coal is lifted step by step until its discharge into the pit wagon. The machine may be readily manipulated and does away with the necessity of having operators for shoveling coal into the pit wagon. The machine takes up very little room and can be readily handled in narrow tunnels. It will be understood, of course, that the coal is cut down from the breast of the tunnel onto the forward end of the elevating plate, though the forward end of the elevating plate may be used for undercutting the breast of coal.

Having described my invention, what I claim is:

1. A machine of the character described including a chute, means for supporting the chute at an upward and rearward inclination to a horizontal plane, an elevating plate slidably mounted within the chute and formed with a plurality of upwardly and rearwardly extending faces, the forward end of the plate being formed with upwardly and rearwardly extending teeth, and means for reciprocating the plate relative to the chute.

2. A machine of the character described including a chute, means for supporting the chute at an upward and rearward inclination to a horizontal plane, an elevating plate mounted within the chute and formed with a plurality of upwardly and rearwardly extending faces, the forward end of the plate being formed with upwardly and rearwardly extending teeth, a pair of upwardly and rearwardly extending reciprocating bars operatively supported above said chute, a plurality of downwardly and rearwardly directed scrapers pivoted to said bars, said scrapers having free movement upward and rearward but having a limited downward and forward movement, and means for reciprocating the plate and reciprocating said bars alternately with relation to the plate.

3. A machine of the character described including a chute, means for supporting the chute at an upward and rearward inclination to a horizontal plane, an elevating plate mounted within the chute and formed with a plurality of upwardly and rearwardly extending faces, the forward end of the plate being formed with upwardly and rearwardly extending teeth, a pair of upwardly and rearwardly extending reciprocating bars operatively supported above said chute, a plurality of downwardly and rearwardly pivoted scrapers attached to said bars, said scrapers having free movement upward and rearward but having a limited downward and forward movement.

4. A machine of the character described including a chute supported at an upward and rearward inclination to a horizontal plane, an elevating member mounted within the chute and provided with a plurality of rearwardly and upwardly extending faces, and means for reciprocating the member, and oppositely reciprocating means for preventing retrograde movement of material on said member and intermittently carrying said material upward over the member.

5. A machine of the character described including a chute supported at an upward and rearward inclination to a horizontal plane, an elevating plate mounted within the chute and provided with a plurality of forwardly and upwardly extending faces, means for reciprocating the plate, and means for detaining material passing up the plate to prevent retrograde movement of the material, said means including a plurality of members pivotally supported at their upper ends and depending into the chute and having free upward and rearward movement and limited downward and forward movement.

6. A machine of the character described including a chute, means for supporting the chute at an upward and rearward inclination to a horizontal plane, a corrugated elevating member reciprocatably mounted within the chute, means for reciprocating the plate, and means for holding material from reverse movement downward on the elevating member comprising detaining members pivotally supported above the plate freely movable upward and rearward to permit the passage of material up the plate but having limited movement downward, said members acting to impede downward passage of materials.

7. A machine of the character described including an upwardly and rearwardly inclined reciprocating member having corrugations in its upper face, means for reciprocating the member, and means for preventing reverse downward movement of the materials on the member comprising a plurality of detaining members pivotally supported above the member and normally extending downward and rearward, said detaining members having free movement upward and rearward but having limited downward and forward movement.

8. A machine of the character described including a supporting frame, an upwardly and rearwardly inclined longitudinally reciprocatable corrugated member, means for reciprocating said member, upwardly and rearwardly inclined longitudinally reciprocatable bars operatively supported above the member, means for reciprocating said bars, and means for preventing reverse downward movement of material on the member including detaining members pivoted to said bars and extending downward adjacent to the upper face of the member, and flexible means holding said detaining members normally in a downwardly and rearwardly inclined position and permitting free rearward and upward movement of said detaining members but limiting the downward and forward movement thereof.

9. A machine of the character described including a chute, means for supporting the chute at an upward and rearward inclination, members operatively connected to the frame formed by the chute and legs and extending above the side walls of the chute and formed at their upper ends with guides, bars longitudinally reciprocatable in said guides in a direction approximately parallel to the chute, an elevating member disposed within said chute and formed upon its upper face with a plurality of transversely extending corrugations, means for reciprocating said elevating member, means for reciprocating the sliding bars in directions opposite to the direction of reciprocation of the plate, and scrapers yieldingly supported upon said bars and depending into the chute yielding to upward movement of the material being elevated but impeding downward movement thereof.

10. A machine of the character described including a supporting frame, a chute mounted upon the frame and extending upward and rearward from one end of the frame to the other, means mounted on the frame for holding the frame against rearward movement on the floor of a tunnel, an elevating member mounted within and resting upon the bottom of the chute and provided with a plurality of rearwardly and upwardly extending faces, and means for reciprocating said plate.

11. A machine of the character described including a supporting frame, an upwardly and rearwardly inclined longitudinally reciprocatable member having upwardly and rearwardly extending corrugations in its face, upwardly and rearwardly inclined longitudinally reciprocatable bars operatively supported above the member, means for preventing reverse downward movement of material on the member including detaining members having their upper ends operatively connected to said reciprocating bars, said members being adapted to lift and ride over the material on the member upon a downward movement of the members relative to the member, and means for reciprocating the member and said bars in opposite directions.

In testimony whereof I hereunto affix my signature in the presence of two witnesses.

JOHN CHABALA.

Witnesses:
JOHN LUKACS,
JOSEPH DAVIS.